(12) United States Patent
Wei et al.

(10) Patent No.: US 11,463,350 B2
(45) Date of Patent: Oct. 4, 2022

(54) INTERCONNECTING LOCAL RPL INSTANCE NODES VIA GLOBAL RPL INSTANCE NODE AS AODV RELAY

(71) Applicant: Cisco Technology, Inc., San Jose, CA (US)

(72) Inventors: Ling Wei, Shanghai (CN); Wenjia Wu, Shanghai (CN); Nan Yi, Shanghai (CN); Chuanwei Li, Shanghai (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/102,003

(22) Filed: Nov. 23, 2020

(65) Prior Publication Data

US 2022/0166707 A1    May 26, 2022

(51) Int. Cl.
*H04L 12/28* (2006.01)
*H04L 45/30* (2022.01)
*H04L 12/46* (2006.01)
*H04L 12/18* (2006.01)

(52) U.S. Cl.
CPC .............. *H04L 45/30* (2013.01); *H04L 12/18* (2013.01); *H04L 12/46* (2013.01)

(58) Field of Classification Search
CPC .......... H04L 45/30; H04L 12/18; H04L 12/46
See application file for complete search history.

(56) References Cited

U.S. PATENT DOCUMENTS 8,630,177 B2   1/2014 Vasseur et al.
9,306,841 B2   4/2016 Vasseur et al.
9,426,035 B2   8/2016 Shetty et al.
10,320,652 B2  6/2019 Thubert et al.
10,749,786 B2  8/2020 Thubert et al.
(Continued)

FOREIGN PATENT DOCUMENTS

JP    6516105 B2    5/2019

OTHER PUBLICATIONS

Anamalamudi et al., "AODV based RPL Extensions for Supporting Asymmetric P2P Links in Low-Power and Lossy Networks", May 7, 2020, ROLL Internet Draft, [online], [retrieved on Sep. 22, 2020]. Retrieved from the Internet: URL: <https://tools.ietf.org/pdf/draft-ietf-roll-aodv-rpl-08.pdf>, pp. 1-27.
(Continued)

*Primary Examiner* — Abdelnabi O Musa
(74) *Attorney, Agent, or Firm* — Leon R. Turkevich (57) ABSTRACT

In one embodiment, a method comprises: determining, by a network device that is configured for joining a local directed acyclic graph (DAG) instance in a data network, an unreachability by the network device to any member of the local DAG instance; generating and broadcasting, by the network device, a request message that identifies the network device requesting to join the local DAG instance, the request message causing a neighboring network device in a global DAG instance of the data network to rebroadcast the request message for reception by a member of the local DAG instance, the neighboring network device a non-member of the local DAG instance; and receiving, by the network device, a reply message indicating a member of the local DAG instance is reachable via the neighboring network device in the global DAG instance.

18 Claims, 9 Drawing Sheets

(56) References Cited

U.S. PATENT DOCUMENTS

| | | | |
|---|---|---|---|
| 2013/0223218 A1* | 8/2013 | Vasseur | H04L 43/0876 |
| | | | 370/232 |
| 2014/0029624 A1* | 1/2014 | Vasseur | H04W 40/28 |
| | | | 370/401 |
| 2014/0136881 A1 | 5/2014 | Vasseur et al. | |
| 2015/0381473 A1* | 12/2015 | Murakami | H04L 45/22 |
| | | | 370/351 |
| 2016/0072697 A1* | 3/2016 | Thubert | H04L 45/02 |
| | | | 370/254 |
| 2017/0019804 A1 | 1/2017 | Morchon et al. | |
| 2020/0028888 A1 | 1/2020 | Levy-Abegnoli et al. | |
| 2020/0119979 A1 | 4/2020 | Woodland et al. | |
| 2020/0177498 A1* | 6/2020 | Thomas | H04L 45/02 |
| 2020/0259736 A1 | 8/2020 | She et al. | |

OTHER PUBLICATIONS

Winter, Ed., et al., "RPL: IPv6 Routing Protocol for Low-Power and Lossy Networks", Internet Engineering Task Force (IETF), Request for Comments: 6550, Mar. 2012, [online], [retrieved on Jan. 31, 2020]. Retrieved from the Internet: URL: <https://tools.ietf.org/pdf/rfc6550.pdf>, pp. 1-157.

Thubert et al., U.S. Appl. No. 16/789,862, filed Feb. 13, 2020.

\* cited by examiner

INTERCONNECTING LOCAL RPL INSTANCE NODES VIA GLOBAL RPL INSTANCE NODE AS AODV RELAY

TECHNICAL FIELD

The present disclosure generally relates to interconnecting local Routing for Low-Power and Lossy Network (RPL) instance nodes via a global RPL instance node as an Ad Hoc On-demand Distance Vector Routing (AODV) relay.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

A Low-power and Lossy Network (LLN) is a network that can include dozens or thousands of low-power router devices configured for routing data packets according to a routing protocol designed for such low power and lossy networks (RPL): such low-power router devices can be referred to as "RPL nodes". Each RPL node in the LLN typically is constrained by processing power, memory, and energy (e.g., battery power); interconnecting links between the RPL nodes typically are constrained by high loss rates, low data rates, and instability with relatively low packet delivery rates. A network topology (a "RPL instance") can be established based on creating routes in the form of a directed acyclic graph (DAG) toward a single "root" network device, also referred to as a "DAG root" or a "DAG destination". Hence, the DAG also is referred to as a Destination Oriented DAG (DODAG), and the "RPL instance" also can be referred to as a "DAG instance". Network traffic moves either "up" towards the DODAG root or "down" towards the DODAG leaf nodes.

A single "global" DAG instance can include thousands of RPL nodes, which can result in substantial congestion that can reduce the performance of network traffic: local optimization can be attempted based on deploying, within the single global DAG instance, one or more local DAG instances that are logically separated from each other and the single global DAG instance; hence, a local DAG instance can confine relevant communications to only prescribed members of the local DAG instance, while the local DAG instance root can communicate with an application server via the global DAG instance.

A problem in forming a local DAG instance, however, is that one or more prescribed members may be unable to join the local DAG instance if the prescribed member is unable to detect an advertisement message for the local DAG instance from another advertising member having already joined the local DAG instance, for example due to unstable data links between prescribed members. Hence, even though the prescribed member may have many neighboring network devices belonging to the global DAG instance, the prescribed member is unable to join the local DAG instance without detecting the advertisement message from another advertising member having already joined the local DAG instance.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

In one embodiment, a method comprises: determining, by a network device that is configured for joining a local directed acyclic graph (DAG) instance in a data network, an unreachability by the network device to any member of the local DAG instance; generating and broadcasting, by the network device, a request message that identifies the network device requesting to join the local DAG instance, the request message causing a neighboring network device in a global DAG instance of the data network to rebroadcast the request message for reception by a member of the local DAG instance, the neighboring network device a non-member of the local DAG instance; and receiving, by the network device, a reply message indicating a member of the local DAG instance is reachable via the neighboring network device in the global DAG instance.

In another embodiment, an apparatus comprises non-transitory machine readable media configured for storing machine readable code, a device interface circuit configured for joining a global directed acyclic graph (DAG) instance in a data network; and a processor circuit. The processor circuit is configured for executing the machine readable code, and when executing the machine readable code operable for: determining, as a network device configured for joining a local DAG instance in the data network, an unreachability to any member of the local DAG instance; generating a request message and causing the device interface circuit to broadcast the request message, the request message identifying the network device requesting to join the local DAG instance, the request message causing a neighboring network device in the global DAG instance to rebroadcast the request message for reception by a member of the local DAG instance, the neighboring network device a non-member of the local DAG instance; and establishing reachability to the local DAG instance based on receiving, by the network device, a reply message indicating a member of the local DAG instance is reachable via the neighboring network device in the global DAG instance.

In another embodiment, one or more non-transitory tangible media is encoded with logic for execution by a machine and when executed by the machine operable for: determining, by the machine implemented as a network device that is configured for joining a local directed acyclic graph (DAG) instance in a data network, an unreachability by the network device to any member of the local DAG instance; generating and broadcasting, by the network device, a request message that identifies the network device requesting to join the local DAG instance, the request message causing a neighboring network device in a global DAG instance of the data network to rebroadcast the request message for reception by a member of the local DAG instance, the neighboring network device a non-member of the local DAG instance; and receiving, by the network device, a reply message indicating a member of the local DAG instance is reachable via the neighboring network device in the global DAG instance.

In another embodiment, a method comprises: joining, by a network device, a global directed acyclic graph (DAG) instance in a data network; receiving, by the network device, a request message that is broadcast by a requesting network device in the global DAG instance, the request message indicating the requesting network device is requesting to join a local DAG instance in the data network; determining, by the network device, that the network device is a non-member of the local DAG instance identified in the request message, and in response generating an updated request message based on inserting, into the request message, a network address of the network device, and broadcasting the updated request message; receiving, by the network device, a unicast reply message indicating reachability information for reaching the local DAG instance; and unicast transmitting, by the network device to the requesting network device, an updated reply message indicating the local DAG instance is reachable via the network device, enabling the requesting network device to reach the local DAG instance via the network device.

DETAILED DESCRIPTION

Particular embodiments provide an automated self-healing mechanism within a local DAG instance that is established within a global DAG instance of a data network. The particular embodiments enable one or more disconnected prescribed members of a local DAG instance to establish reachability to the local DAG instance via one or more neighboring network devices that are members of the global DAG instance but non-members of the local DAG instance, where a disconnected prescribed member of a local DAG instance can cause a neighboring non-member network device to operate as an AODV relay between the disconnected prescribed member and an attached member in the local DAG instance.

The neighboring non-member network device, as a member of the global DAG instance but a non-member of the local DAG instance, can cause a network path to be established between the disconnected prescribed member and the attached member in the local DAG instance, for example based on the attached member being a neighboring network device that can establish a data link with the neighboring non-network network device, or based on the attached member being reachable via a second neighboring non-network network device that can result in a multi-hop network path between the disconnected prescribed member and the attached member.

Hence, the example embodiments enable a disconnected prescribed member network device of a local DAG instance to initiate its own AODV-based relay path via one or more non-network devices in the global DAG instance for establishment of one or more reliable paths to an attached member in the local DAG instance. The example embodiments enable a network device encountering unreliable link layer connections with attached members of a local DAG instance to automatically initiate relay paths, without the need for any actions by a management application associated with the local DAG instance; hence, the local DAG instance can be self-established and self-healing, without any need for management of local connections between members of the local DAG.

Figure 1A:
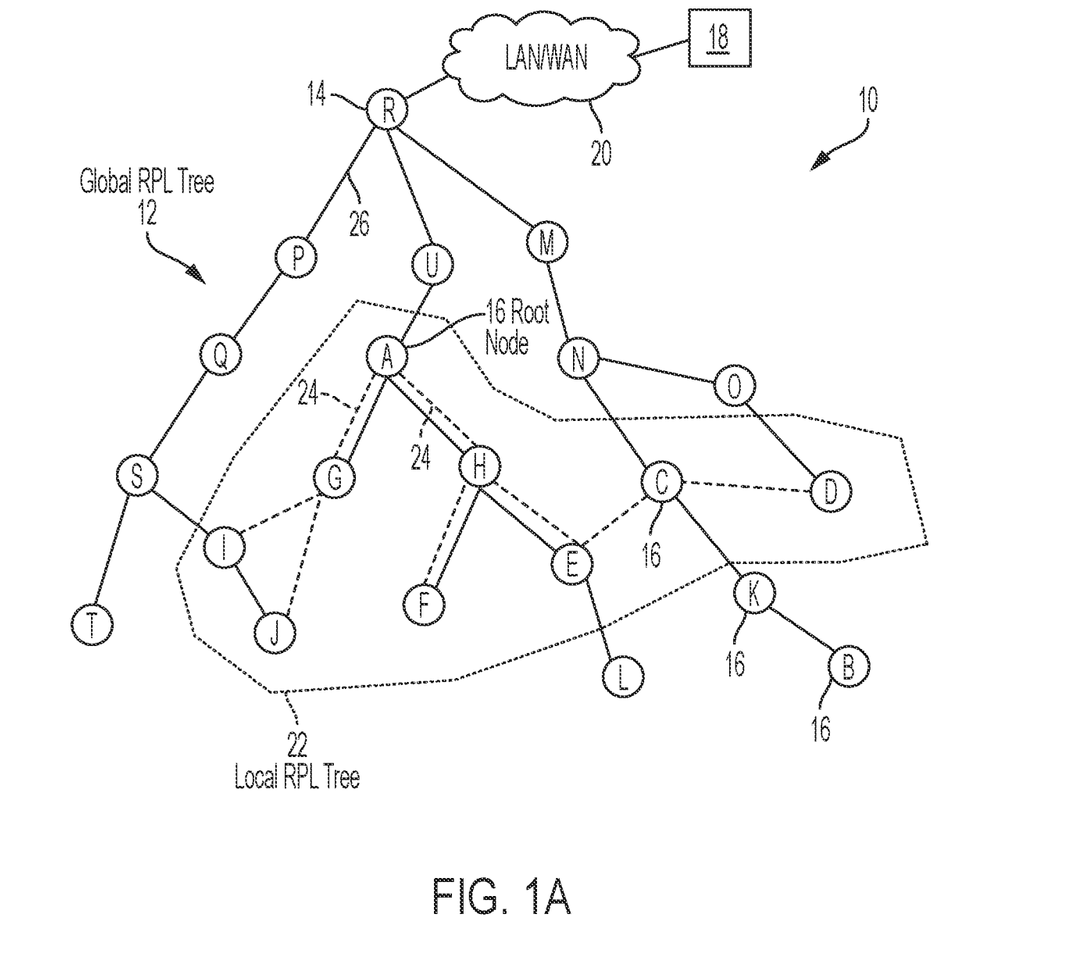
FIGS. 1A-1E illustrate an example global DAG instance in a data network and having an apparatus for joining a local DAG instance via a neighboring network device that is a non-member of the local DAG instance, according to an example embodiment.

FIG. 1A illustrates an example data network 10, for example a low power and lossy network (LLN) 10 having a tree-based DODAG topology 12 comprising a root network device "R" 14 and attached RPL network devices "A" through "Q" and "S" through "U" 16 within the LLN 10 and rooted by the root network device "R" 14, according to an example embodiment. The tree-based DODAG topology 12, also referred to herein as a "global" instance 12 of a directed acyclic graph (DAG) topology (or a global DAG instance 12), can be established according to the Internet Engineering Task Force (IETF) Request for Comments (RFC) 6550. In particular, the global root network device "R" 14 can advertise a DODAG information object (DIO) message that specifies a prescribed global instance identifier, described for example in Section 5.1 of RFC 6550. Each of the RPL network devices 16 can join the global DAG instance 12 in response to receiving the DIO message initiated by the global root network device "R" 14, attaching to the global DAG instance 12, and outputting an updated version of the DIO message with updated metrics that enable other RPL network devices 16 to attach to the global DAG instance 12.

The LLN 10 can be implemented as a part of a larger data network, for example a smart grid Advanced Metering Infrastructure (AMI) network that can utilize a connected grid mesh (CG-Mesh) that comprises a field area router (FAR) 14 and thousands of network devices 16, where each network device 16 can reach, within its transmission range, hundreds of neighboring network devices. Hence, conventional deployments of the RPL protocol (e.g., according to RFC 6550) can suffer from many inefficiencies in a DAG network topology 12 in LLNs 10 that contain thousands of network devices that are densely deployed in the data network. Consequently, a server device (e.g., a management device, a computing device, a file server device, etc.) 18 deployed in a local area network (LAN)/wide area network (WAN) 20 that is attempting to send and/or receive data packets to or from one or more RPL network devices 16 via the LLN 10 can encounter substantial delays due to the thousands of LLN devices 16 in the LLN 10. Further, transmission of multiple data packets between the numerous RPL network devices 16 and the server device 18 is not scalable due to the limited constraints of the global DAG instance 12, including the substantial traffic burdens on the global root network device "R" 14 and neighboring RPL network devices 16 near the global root network device "R" 14 (e.g., network devices "M", "P", "U").

Local optimization within the global DAG instance 12 can be attempted based on a network device (e.g., node "A") 16 establishing within the LLN 10 a local DAG instance 22, described for example in RFC 6550, that is separate and distinct from the global DAG instance 12.

A local DAG instance 22 or "RPL Instance" is described in RFC 6550 as a set of one or more DODAGs that share a RPLInstanceID. At most, a RPL node can belong to one DODAG in a RPL Instance. Each RPL Instance operates independently of other RPL Instances. In particular, RFC 6550 describes two types of RPL Instances: Local and Global. RPL divides the RPLInstanceID space between Global and Local instances to allow for both coordinated and unilateral allocation of RPLInstanceIDs. Global RPL Instances are coordinated, have one or more DODAGs, and are typically long-lived. Local RPL Instances are always a single DODAG whose singular root owns the corresponding DODAGID and allocates the local RPLInstanceID in a unilateral manner.

The local DAG instance 22 can be established based on a network device (e.g., node "A") initiating transmission of a "local" DIO message that advertises itself as the corresponding local root node of the local DAG instance 22; for example, the network device "A" 16 can insert its IPv6 address (e.g., "A::A") as the local RPL instance ID into the "local" DIO message. A prescribed collection of the RPL network devices 16 (e.g., network devices "B" through "J" 16) can be configured for joining the prescribed local DODAG instance 22 in response to detecting the "local" DIO message specifying the IPv6 address (e.g., "A::A") of the network device "A" as the local DAG instance identifier. The local root network device "A" 16 can be configured for transmitting the "local" DIO message (specifying the local DAG instance identifier, e.g., "A::A") either before or after the local root network device "A" 16 has joined the global DAG instance 12.

As illustrated in FIG. 1A, the network devices "C" through "J" can join the local DAG instance 22 in response to detecting, from a neighboring network device 16, the "local" DIO message originated by the local root network device "A" 16. As described previously, the network devices "B" through "J" 16 can be configured for joining the local DAG instance 22 in response to detecting the local DIO message specifying the appropriate local DODAG instance identifier (e.g., "A::A"). For example, the network devices "G" and "H" 16 can join the local DAG instance 22 (illustrated by the local DAG instance connection 24 shown as a dashed line) in response to detecting transmission of the "local" DIO message from the neighboring local root network device "A" 16; the network devices "I" and "J" 16 can join the local DAG instance 22 in response to detecting an updated local DIO message from the neighboring member network device "G" 16; the network devices "E" and "F" 16 can join the local DAG instance 22 in response to detecting an updated local DIO message from the neighboring member network device "H" 16; the network device "C" can join the local DAG instance 22 in response to detecting an updated local DIO message from the neighboring member network device "C"; and the network device "D" 16 can join the local DAG instance 22 in response to detecting an updated local DIO message from the neighboring member network device "C" 16.

Hence, the network devices "C" through "J" can join the local DAG instance 22 in response to detecting the local DIO message (or updated version thereof) that specifies the prescribed local instance identifier (e.g., "A::A") associated with the local root network device "A" 16.

As illustrated in FIG. 1A, the local DAG instance 22 can operate separately and distinct from the global DAG instance 12, enabling specific data flows to be isolated within the local DAG instance 22 via the local DAG instance connections 24 that are separate and distinct from any global DAG instance connection 26 (illustrated as a solid line) in the global DAG instance 12. Hence, the global DAG instance 12 can be used for transmitting data throughout the entire LLN 10, as appropriate (e.g., for power outage notification messages, power restoration messages, firmware update messages, etc.), while one or more local DAG instances 22 can be used for isolating communications for domain-specific operations (e.g., a specific vendor, specific customer, specific quality of service level, specific data traffic type, etc.) to only members of the local DAG instance 22.

Further, any non-member network device (i.e., not configured to join the local DAG instance 22) can be configured to drop any local DIO message that does not identify a validly-associated local instance identifier; hence, the network devices "K" through "Q", "S" and "T" 16 can be configured for dropping the local DIO message originated by the network device "A" 16. Hence, use of one or more local DAG instances 22 can limit membership to specifically-authorized (or specifically-configured) RPL network devices 16 to prevent any non-member RPL network device 16 from attempting to improperly join a local DAG instance 22.

As apparent from FIG. 1A, however, the member network device "B" 16 is unable to join the local DAG instance 22 because it is unable establish a link layer connection with any of the attached member network devices "C", "D", or "E". Hence, the unattached (i.e., disconnected) member network device "B" 16, even though attached to the global DAG instance 12, is unable to detect a local DIO message transmitted by any of the attached member network devices "C", "D", or "E". Further, the non-member network devices "K" and "L" can be configured for dropping the local DIO message originated by the network device "A" 16 in order to prevent unlimited propagation of the local DIO message throughout the global DAG instance 12 that would otherwise result in network congestion and wasting scarce network resources in the global DAG instance 12.

Hence, the member network device "B" 16 is unable to join the local DAG instance 22 because it is unable to detect a local DIO message originated by the network device "A", and thus remains a disconnected member of the local DAG instance 22.

A RPL network device 16 can encounter problems establishing a reliable local DAG instance connection 24 to a specifically-assigned local DAG instance 22 due to various factors associated with uncertainties encountered with specific group management. For example, assigned members of a local DAG instance 22 can encounter variable network topology and be positioned in unexpected physical locations that can hinder or prevent establishment of reliable data links between assigned members of a local DAG instance 22; further, an application server (executed, for example, in the server device 18) may have no knowledge of the local network topology of the local DAG instance 22; the application server also may have no knowledge of the physical locations of the respective assigned members "A" through "J" of the local DAG instance 22. Hence, there is a concern that an assigned member network device 16 is unable to join an assigned local DAG instance 22 because it is unable to detect corresponding local DIO message originated by the local root network device of the local DAG instance 22; there also is a concern that propagation of a local DIO message be limited to assigned members to prevent unlimited propagation throughout the global DAG instance 12, which would cause congestion and instability in the global DAG instance 12.

As described in further detail below, the disconnected member network device "B" 16 can be configured for establishing reachability to the local DAG instance 22 via one or more neighboring network devices (e.g., "K" and/or "L") that are members of the global DAG instance 12 but are non-members of the local DAG instance 22, based on the disconnected member network device "B" 16 generating and broadcasting a request message (28 of FIG. 1B) that identifies the disconnected member network device "B" 16 as requesting to join the local DAG instance 22 (identifiable by the local DAG instance identifier "A::A"). The disconnected member network device "B" 16 can receive a reply from one or more of the non-member network devices (e.g., "K" and/or "L") indicating reachability to the local DAG instance 22. Hence, the example embodiments enable a disconnected member network device "B" 16 to find its own path for reaching a local DAG instance 22 via a non-member network device 16 that is within the global DAG instance 12.

Although only the RPL network devices "A", "B", "C", and "K" are labeled with the reference numeral "16" in FIGS. 1A-1E to avoid cluttering in the Figures, it should be apparent that all the RPL network devices "A" through "Q" and "S" through "U" are allocated the reference numeral "16" for purposes of the description herein. Further, it should be apparent that all the network devices "A" through "Q" and "S" through "U" 16 (and the global root network device "R" 14) are configured for establishing wireless data links and global DAG instance connections 26, as described herein, even though only the global DAG instance connection "R-P" is labeled with the reference numeral "26" to avoid cluttering. Each of the RPL network devices "A" through J" are configured for establishing one or more local DAG instance connections 24 with another member network device in the local DAG instance 22, as appropriate, even though only the local DAG instance connections "A-G" and "A-H") are labeled with the reference numeral 24 to minimize cluttering. Other local DAG instances can be established within the LLN 10 by any one or more of the RPL network devices 16, as appropriate, for example based on a prescribed allocation assigned by a management entity such as the server device 18.

Figure 1B:
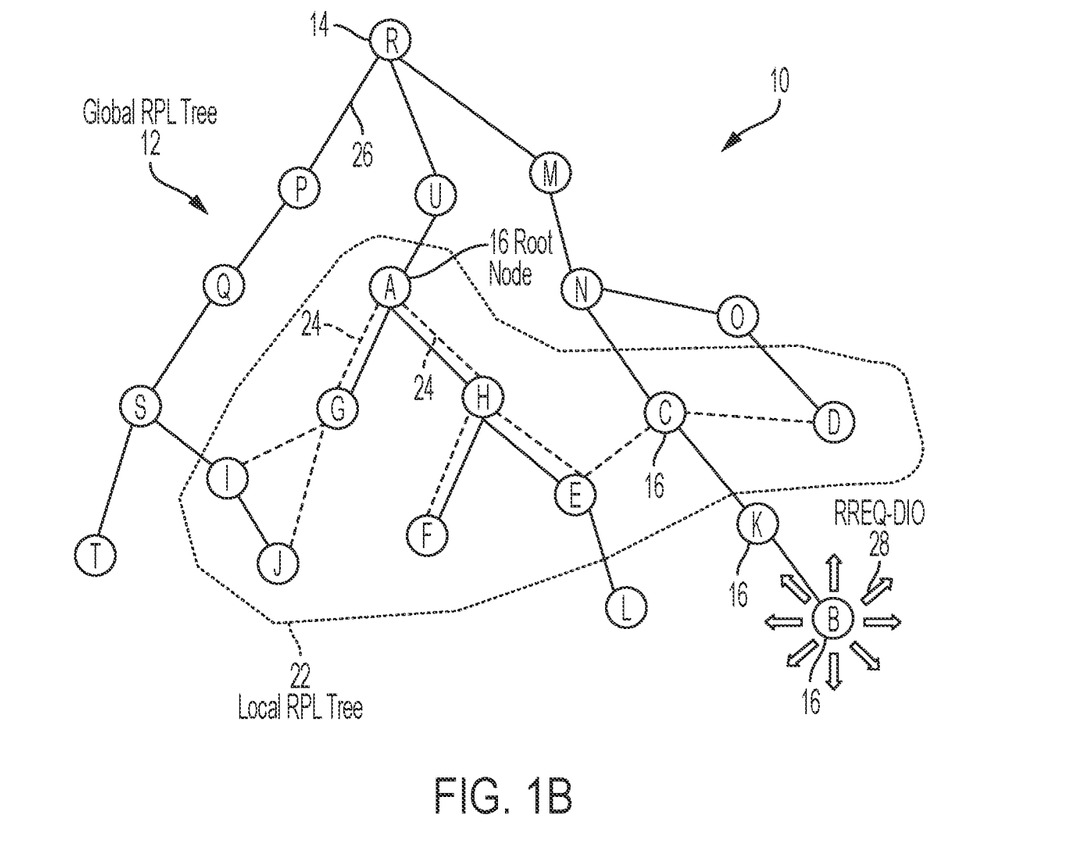
Figure 1C:
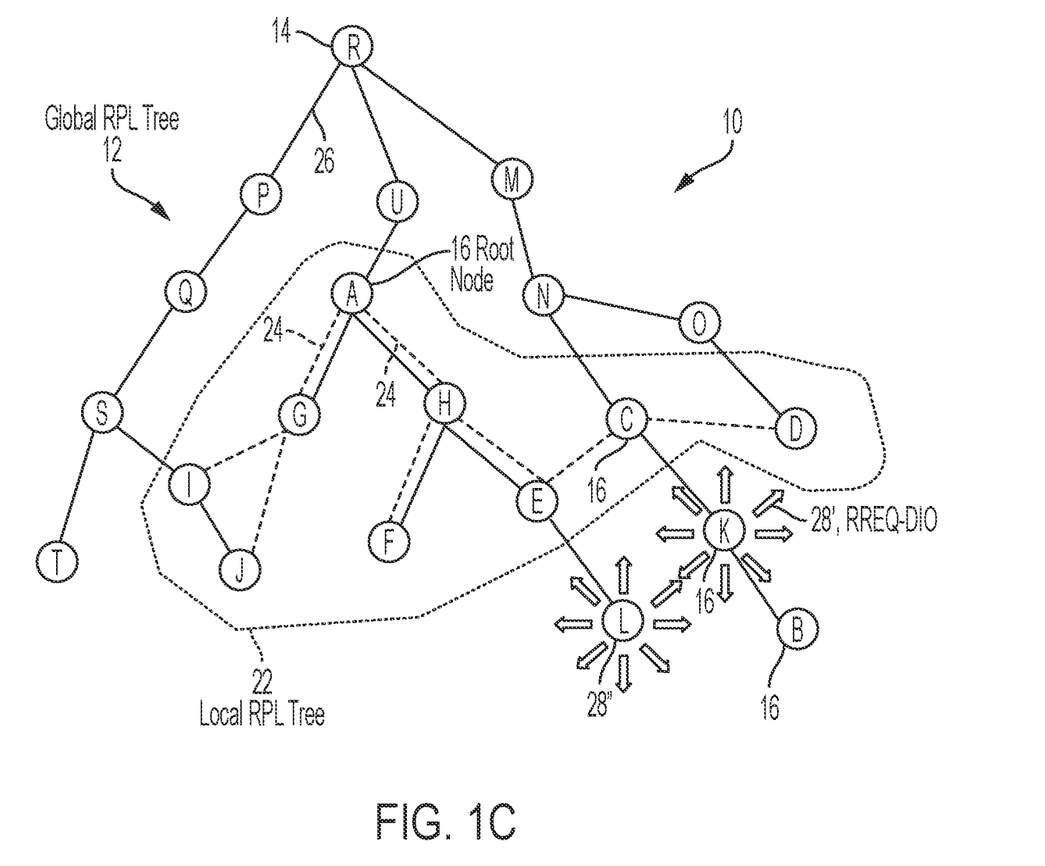
Figure 1D:
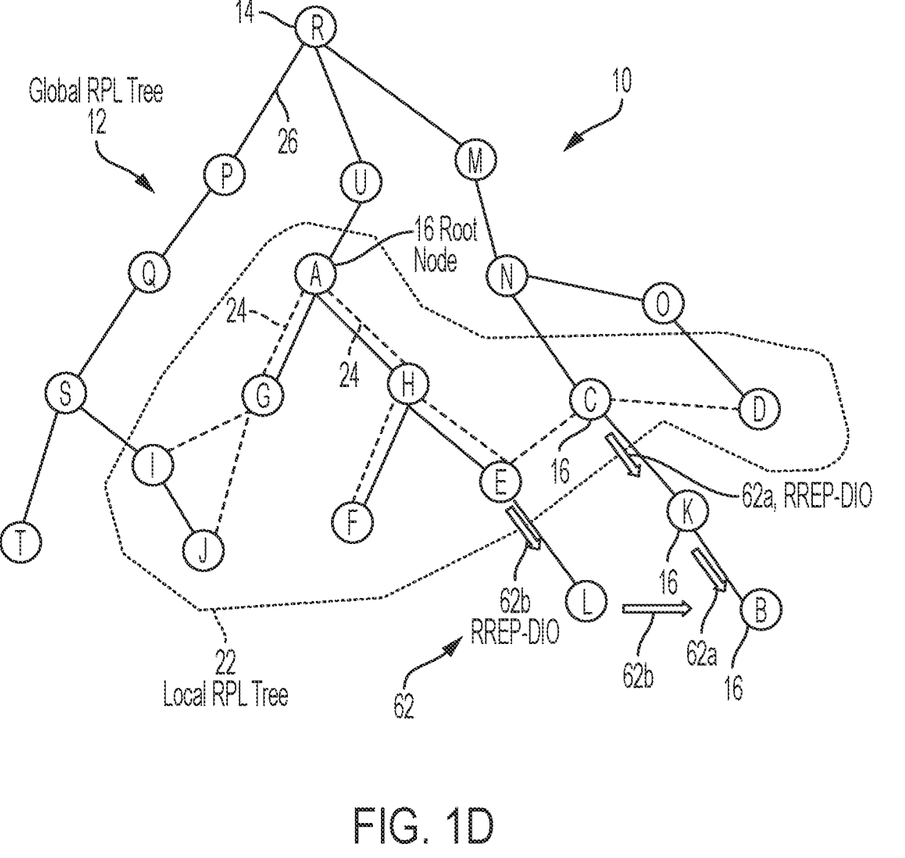
Figure 1E:
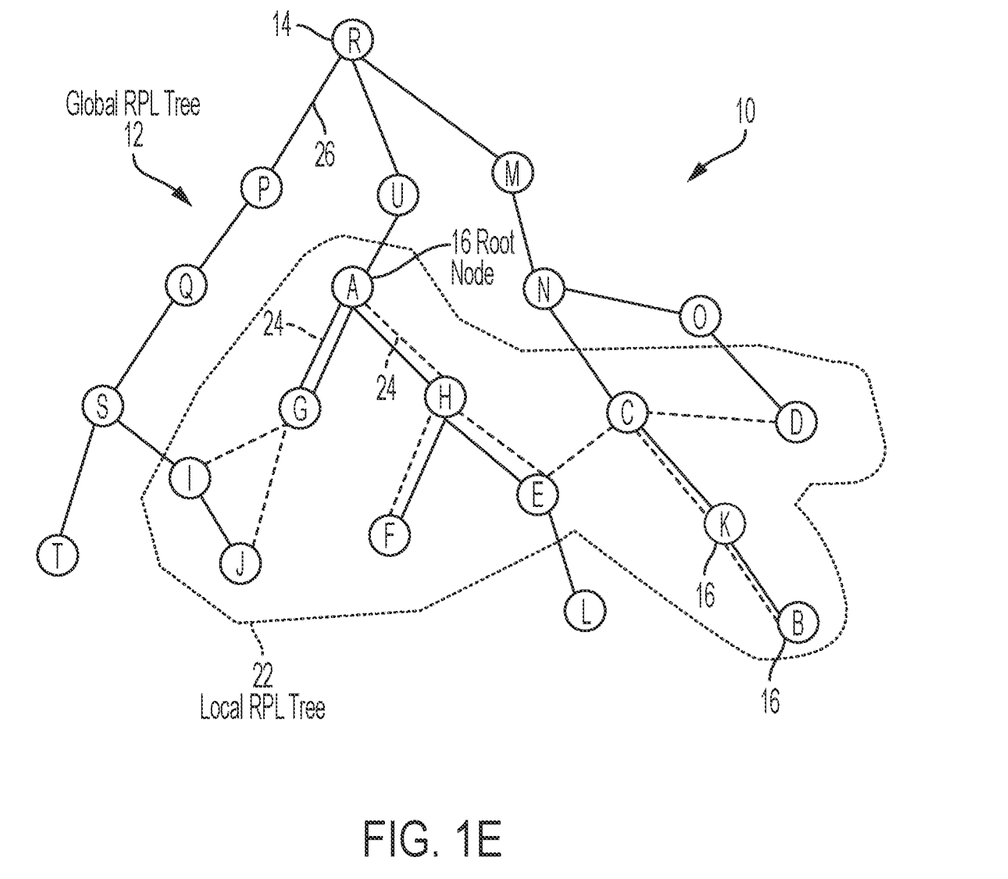
Figure 2:
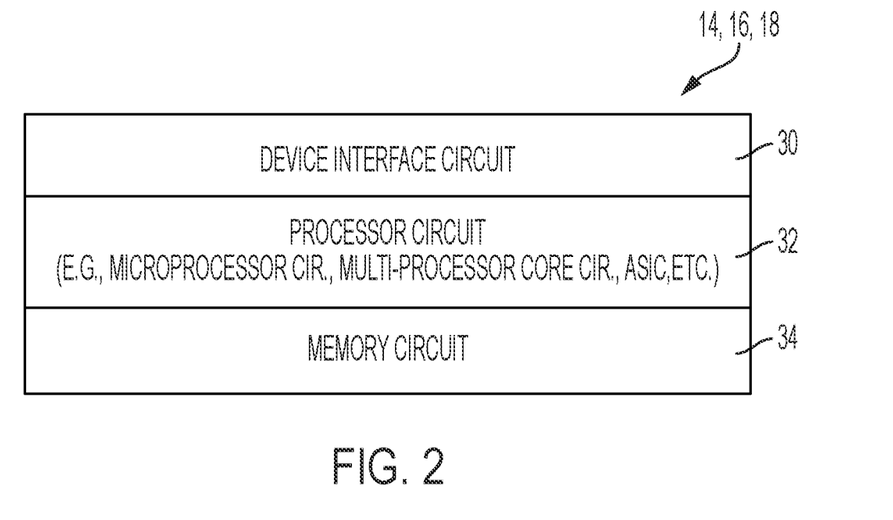
FIG. 2 illustrates an example implementation of any one of the network devices of FIG. 1, according to an example embodiment.

FIG. 2 illustrates an example implementation of any one of the devices 14, 16, and/or 18 of FIGS. 1A-1E, according to an example embodiment. The apparatus 14, 16, and/or 18 is a physical machine (i.e., a hardware device) configured for implementing network communications with other physical machines via the low-power and lossy network 10. The term "configured for" or "configured to" as used herein with respect to a specified operation refers to a device and/or machine that is physically constructed and arranged to perform the specified operation. Hence, the apparatus 14, 16, and/or 18 is a network-enabled machine implementing network communications via the network 10. Each apparatus 16 can be implemented as a constrained device (e.g., a constrained "Internet of Things" device such as a sensor device and/or actuator device having constrained processing, memory, and/or power resources); the global root network device "R" 14 can be implemented as a constrained device or a fully-functioning device (e.g., a "fog" node having a reliable power supply, greater processing capacity and memory capacity than a constrained device); the server device 18 can be implemented as a fully-functioning device or a more powerful computing device (e.g., a cloud computing node deployed in a data center having reliable power supply, etc.).

Each apparatus 14, 16, and/or 18 can include a device interface circuit 30, a processor circuit 32, and a memory circuit 34. The device interface circuit 30 can include one or more distinct physical layer transceivers for communication with any one of the other devices 14, 16, and/or 18; the device interface circuit 30 also can include an IEEE based Ethernet transceiver for communications with the devices of FIG. 1 via any type of data link, as appropriate (e.g., a wired or wireless link, an optical link, etc.) (at least the root network device 14 and/or the server device 18 can have a wired network connection, for example for wired communications in a wired communication network such as a "backbone" network 20 of FIG. 1A). The processor circuit 32 can be configured for executing any of the operations described herein, and the memory circuit 34 can be configured for storing any data or data packets as described herein.

Any of the disclosed circuits of the devices 14, 16, and/or 18 (including the device interface circuit 30, the processor circuit 32, the memory circuit 34, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 34) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 34 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 34 can be implemented dynamically by the processor circuit 32, for example based on memory address assignment and partitioning executed by the processor circuit 32.

Figure 3A:
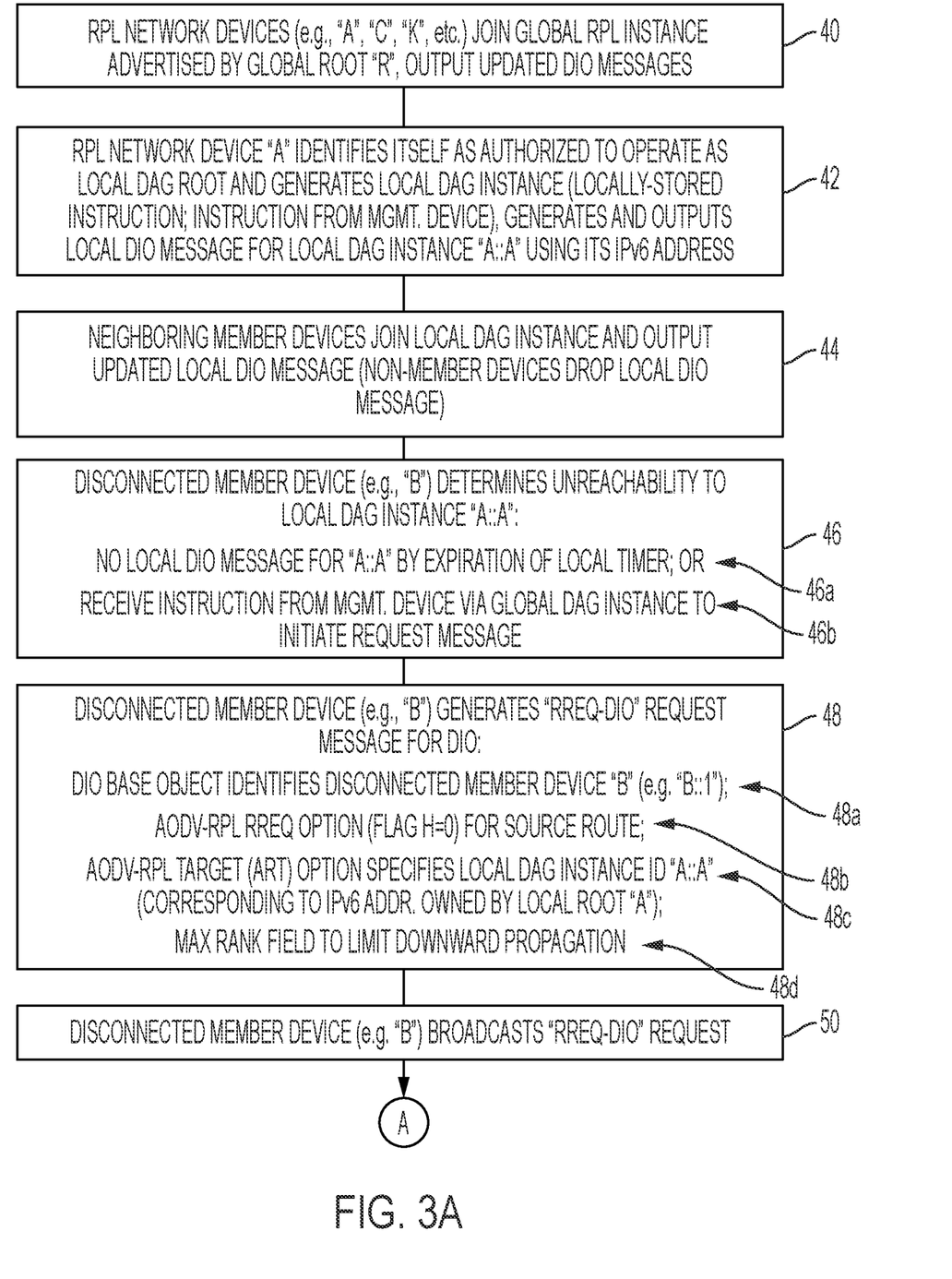
FIGS. 3A-3C illustrate an example method of an apparatus for joining a local DAG instance via a neighboring non-member network device, and the neighboring non-member network device providing reachability to the apparatus, according to an example embodiment.
Figure 3B:
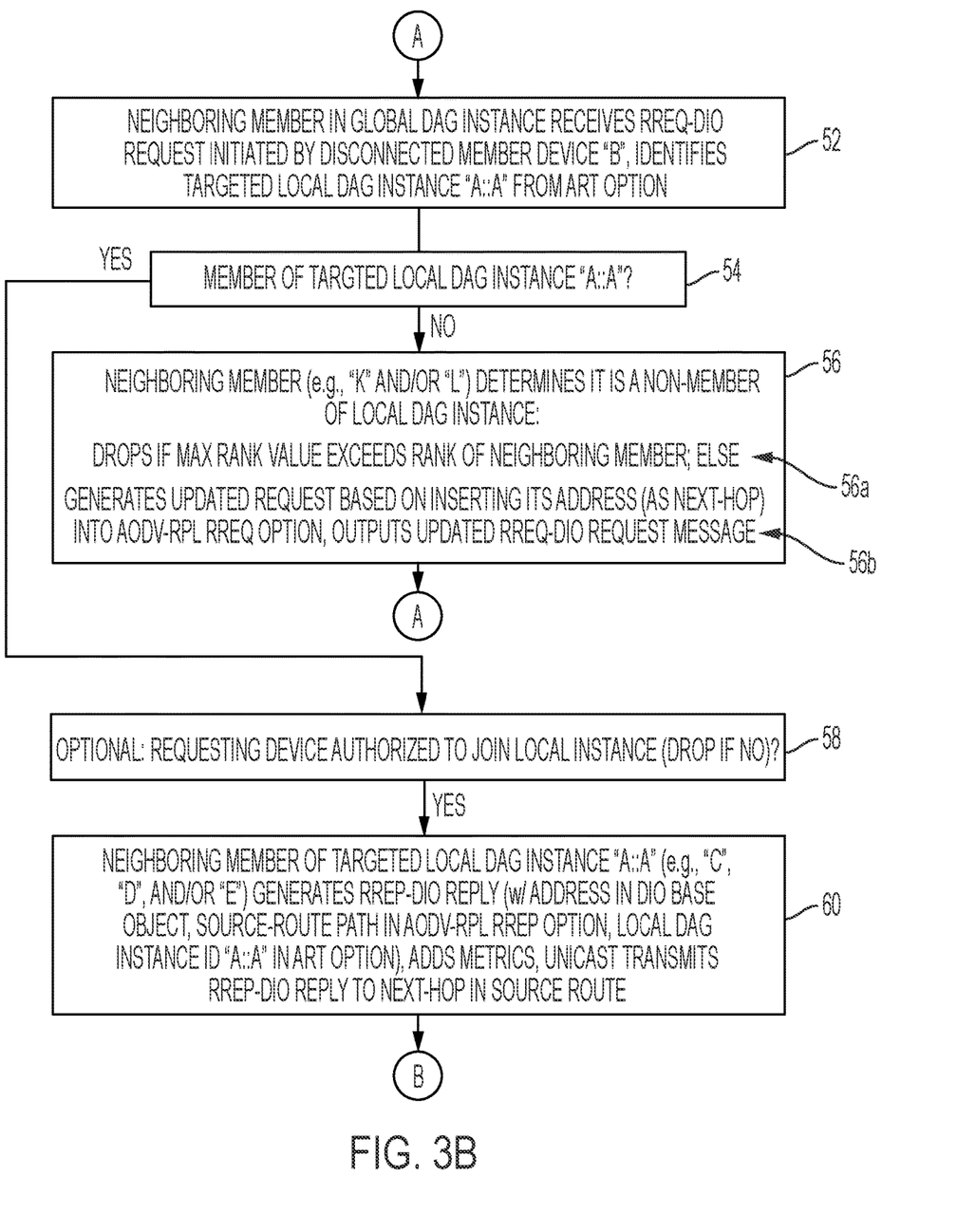
Figure 3C:
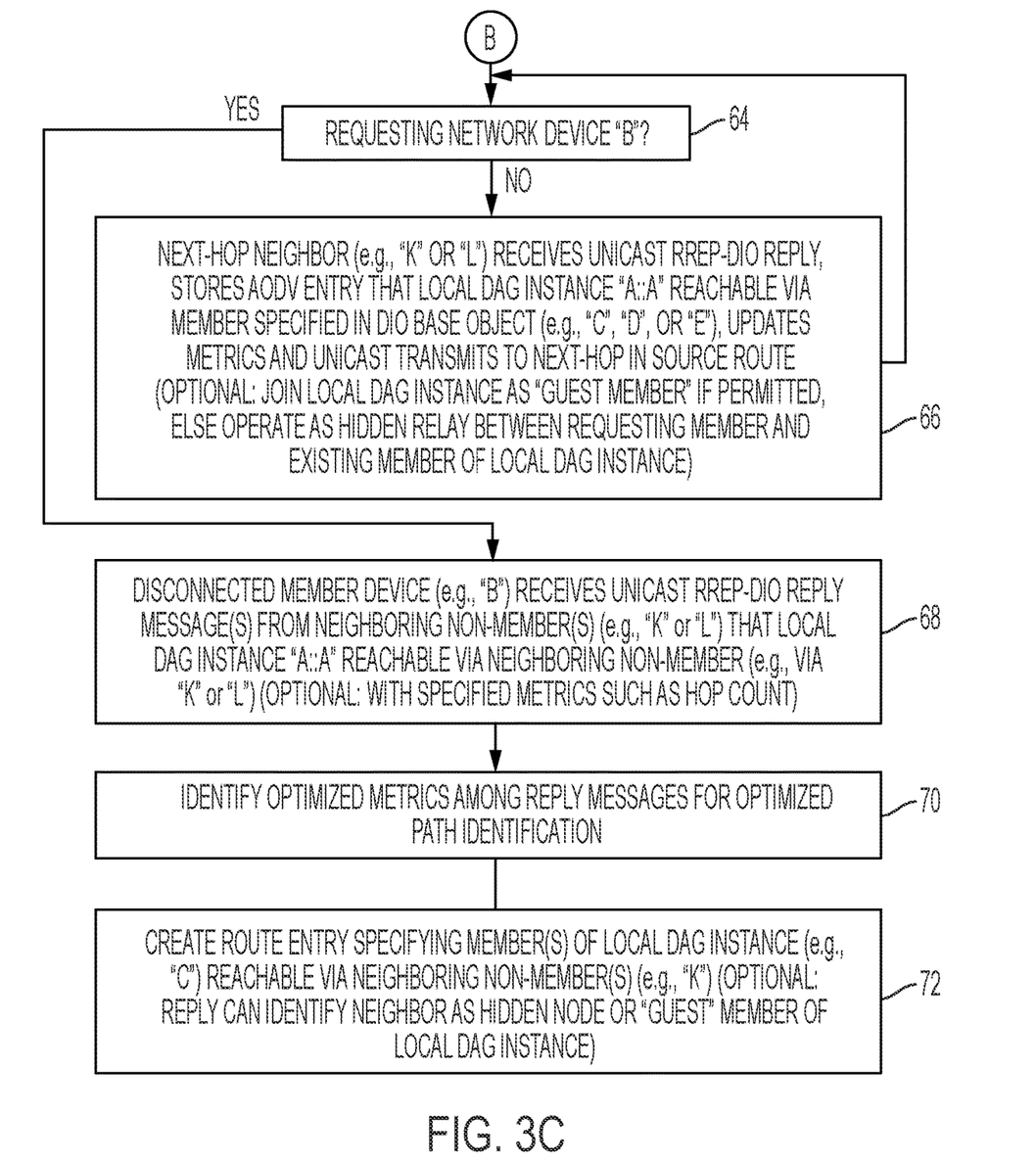

FIGS. 3A-3C illustrate an example method of enabling a network device to join a local DAG instance via a non-member network device in the same global DAG instance, according to an example embodiment.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Referring to FIG. 3A, the processor circuit 32 of any of the network devices (e.g., "A") 16 can be configured for joining in operation 40 a global DAG instance 12 in response to receiving a global DIO message (not shown) from a neighboring member device (e.g., "U") 16 of the global DAG instance 12. In particular, the root network device (i.e., DODAG root) 14 in operation 40 can form the initial tree-based DODAG topology 12, for example based on the root network device 14 outputting a DODAG information object (DIO) advertisement message as described in the Internet Engineering Task Force (IETF) Request for Comments (RFC) 6550. Each RPL network device 16, in response to receiving a root-initiated DIO message, can form an attachment within the tree-based DODAG topology 12 via a corresponding wireless DODAG parent-child connection 26 with either the root network device 14 (e.g., as in the case of RPL nodes "M", "P", and "U" attaching to the root network device 14), or via a corresponding wireless DODAG parent-child connection 26 with a parent network device attached within the tree-based DODAG topology 12 (e.g., as in the case of RPL node "A" attaching to parent RPL node "U", RPL node "C" attaching to parent RPL node "N", etc.). As described in RFC 6550, each RPL network device 16, in response to the root network device 14 and/or a parent RPL network device 16 in the tree-based DODAG topology 12, can output an updated DIO message specifying the corresponding "rank" (e.g., hop count) of the RPL network device 16 relative to the root network device 14, enabling other network devices to join the tree-based DODAG topology 12.

Hence, the processor circuit 32 of the network device "A" 16 in operation 40 can respond to attaching to the network device "U" as a parent in the global DAG instance 12 by generating and outputting an updated global DIO message specifying metrics associated with joining the global DAG instance 12 via the network device "A".

The processor circuit 32 of the network device "A" in operation 42 can identify itself as authorized to initiate, as a local DAG root, generation of a local DAG instance 22: the processor circuit 32 of the network device "A" can identify itself as a root of the local DAG instance 22, for example based on determined instruction stored in the memory circuit 34 (e.g., during manufacture), or in response to the device interface circuit 30 of the network device "A" receiving an instruction from the server device 18 via the global DAG instance 12 to initiate generation of the local DAG instance 22.

The processor circuit 32 of the network device "A" 16 can be configured for generating in operation 42 a local DIO message that specifies the network device "A" as the root of a local DAG instance 22. The network device "A" can identify itself as the root of a local DAG instance 22, for example, based on inserting its corresponding IPv6 address (e.g., "A::A") within a local DAG instance identifier field within the local DIO message, described in further detail in RFC 6550. The processor circuit 32 of the network device "A" 16 can output in operation 42 the local DIO message for reception by neighboring network devices that are authorized to join as members of the local DAG instance 22 (i.e., "member network devices"). Hence, as described previously, any neighboring member network device that detects the local DIO message (or an updated version thereof) (e.g., "C" through "J") in operation 44 can join the local DAG instance 22 based on establishing a local DAG instance connection 24 with its neighboring local parent.

As described previously, however, any non-member network device (e.g., "K" or "L") receiving in operation 44 the local DIO message will drop the received local DIO message. Hence, any member network device (e.g., "B") that is not a neighbor of any member network device that has already joined the local DAG instance 22 can encounter the problem of not being able to reliably detect the transmission of the local DIO message.

Hence, the processor circuit 32 of the disconnected member network device "B" 16 in operation 46 can determine an unreachability to any member of the local DAG instance 22. In one embodiment, the processor circuit 32 of the disconnected member network device "B" 16 in operation 46a can determine the unreachability to the local DAG instance "A::A" 22 in response to expiration of a prescribed timer executed by the processor circuit 32 and allocated for the disconnected member network device "B" 16 to join the local DAG instance "A::A" 22; the processor circuit 32 of the disconnected member network device "B" 16 in operation 46b also can determine the unreachability to the local DAG instance "A::A" 22 in response to reception of an instruction generated by a management device 18, via the global DAG instance 12 (e.g., its global DAG instance parent "K"), that instructs the disconnected member network device "B" 16 to initiate broadcasting of an RREQ-DIO request message 28 to attempt joining the local DAG instance 22 via a non-member network device 16.

In response to determining unreachability to any member of the local DAG instance 22, the processor circuit 32 of the disconnected member network device "B" 16 in operation 48 can generate a request message 28, also referred to as a "route request for DIO message" ("RREQ-DIO") 28 to join the local DAG instance 22. In particular, the processor circuit 32 of the disconnected member network device "B" 16 in operation 48a can insert into the RREQ-DIO request message 28 a DIO Base Object, in accordance with Section 6.3.1 of RFC 6550, that specifies the IPv6 address (e.g., "B::1") of the disconnected member network device "B" 16 in a "DODAGID" field of the DIO Base Object.

The processor circuit 32 of the disconnected member network device "B" 16 in operation 48b also can insert into the RREQ-DIO request message 28 an AODV-RPL RREQ Option in accordance with Sec. 4.1 of the Internet Draft by Anamalamudi et al., entitled "AODV based RPL Extensions for Supporting Asymmetric P2P Links in Low-Power and Lossy Networks (draft-ietf-roll-aodv-rpl-08)" (hereinafter "Anamalamudi et al."), including setting an "H" flag to "H=0" to enable insertion of a source-route into the Address Vector field of the AODV-RPL RREQ Option.

The processor circuit 32 of the disconnected member network device "B" 16 in operation 48c also can insert into the RREQ-DIO request message 28 an AODV-RPL target (ART) option, according to Sec. 4.3 of Anamalamudi et al., that specifies the identifier "A::A" for the local DAG instance 22; as noted previously, the identifier "A::A" corresponds to an IPv6 address owned by the local root network device "A", i.e., the local root network device is reachable via the IPv6 address "A::A".

The processor circuit 32 of the disconnected member network device "B" 16 in operation 48d also can add a maximum rank field that limits downward propagation of the RREQ-DIO request message 28 within the global DAG instance 12; as described below, any network device of the global DAG instance 12 can drop a received RREQ-DIO request message 28 in response to determining its local rank in the global DAG instance 12 is greater than the maximum rank value specified in the maximum rank field.

The processor circuit 32 of the disconnected member network device "B" 16 in operation 50 can cause the device interface circuit 30 to broadcast the RREQ-DIO request message 28 for reception by neighboring network devices in the global DAG instance 12 as illustrated in FIG. 1B, for example the network devices "K" and/or "L" 16.

Referring to FIG. 3B, the processor circuit 32 of each neighboring RPL network device 16 in the global DAG instance 12 can respond to receiving in operation 52 the RREQ-DIO request message 28 by identifying in operation 52 the targeted local DAG instance 22, based on the IPv6 address "A::A" of the local root device "A" that is specified in the ART option. If in operation 54 the processor circuit 32 of the neighboring RPL network device 16 that received the RREQ-DIO request message 28 determines that it is not a member of the targeted local DAG instance "A::A" 22 (e.g., based on detecting no such entry for approved local DAG instances in its memory circuit 34), the processor circuit 32 of the neighboring RPL network device 16 can respond in operation 56 to determining it is a non-member by dropping in operation 56a the RREQ-DIO request message 28 if its own rank in the global DAG instance 12 exceeds the maximum rank value in the maximum rank field; else the processor circuit 32 of the non-member network device (e.g., "K" or "L") 16 can generate an updated RREQ-DIO request message 28' based on inserting its own IPv6 address (e.g., "F6::1" for "K"; or "F7::1" for "L") as a next-hop into the Address Vector field of the AODV-RPL RREQ Option field. The processor circuit 32 of the non-member network device (e.g., "K" or "L") 16 in operation 56b can cause its device interface circuit 30 to rebroadcast the updated RREQ-DIO request message 28' into the global DAG instance 12, illustrated in FIG. 1C. As illustrated in FIG. 1C, the non-member network device "K" 16 can rebroadcast (following updating) the RREQ-DIO request message 28' and the non-member network device "L" can rebroadcast (following updating) the RREQ-DIO request message 28".

If in operation 52 a second non-member network device (not shown) receives the updated RREQ-DIO request message 28' and is not beyond the max rank limit, the second non-member network device (not shown) in operations 54 and 56 can update the next-hop into the Address Vector field of the AODV-RPL RREQ Option field with its own IPv6 address (e.g., "FF10::1") and broadcast the updated "RREQ-DIO" request message with the updated Address Vector field, enabling formation of a multi-hop source-route address (e.g., "FF10::1|"F6::1"), as needed, for reaching a member device 16 of the local DAG instance 22 (the symbol "|" refers to a separation between the IPv6 address "FF10:: 1" of the second non-member network device and the IPv6 address "F6::1" of the non-member network device "K").

If in operation 52 the RREQ-DIO request message 28 or the updated RREQ-DIO request message 28' and/or 28" is received by an attached member network device (e.g., "C" or "E") 16, the processor circuit 32 of the member network device (e.g., "C" or "E") 16 can respond in operation 54 to determining it is an attached member of the targeted local DAG instance "A::A" (as specified in the ART Option of the RREQ-DIO request message 28, and/or the updated RREQ-DIO request message 28' or 28") by optionally determining in operation 58 whether the requesting network device "B" 16 (identified by the IPv6 address "B::1" specified in the "DODAGID" field of the DIO Base Object) is an authorized member of the local DAG instance 22. If the requesting network device "B" 16 is not an authorized member of the local DAG instance 22, the attached member network device (e.g., "C" or "E") 16 in operation 58 can drop the received request message 28, 28', and/or 28" or alternately unicast transmit a "deny" response that denies access to the local DAG instance 22.

Assuming in operation 58 that the requesting device is authorized (else if the optional operation 58 need not be performed), the attached member network device (e.g., "C" or "E") 16 in operation 60 can respond to the updated RREQ-DIO request message 28' and/or 28" by generating a reply message 62, illustrated in FIG. 1D. For example, the processor circuit 32 of the member network device "C" 16 in operation 60 can generate a Route Reply for DIO (RREP-DIO) message 62a that specifies the member network device IPv6 address (e.g., "C::1") within the "DODAGID" field of the DIO Base Object field, a source-route path in an Address Vector field of an AODV-RPL RREP Option (obtained from the corresponding Address Vector field of the AODV-RPL RREQ Option in the received RREQ-DIO request message 28' or 28"), and the local DAG instance identifier "A::A" in the corresponding ART option field. The processor circuit 32 of the member network device "C" 16 in operation 60 also can add, to the RREP-DIO reply message 62a, associated metrics associated with selectively attaching to the member network device "C" 16 within the local DAG instance 22.

Hence, the attached member network device "C" 16 in operation 60 can respond to reception of the RREQ-DIO request message 28' (e.g., from the non-member network device "K") by generating and unicast transmitting a RREP-DIO reply message 62a specifying the network device "C" (at the IPv6 address "C::1" specified in the "DODAGID" field of the DIO Base Object) provides reachability to the targeted local DAG instance "A::A" 22 (identified in the ART Option) via the source-route path specified in the Address Vector field of the AODV-RPL RREP Option (e.g., "B::1" via "F6::1"; or "B::1" via "FF10::1|"F6::1" if multi-hop as described above), along with associated metrics for reaching the local DAG instance 22 via the network device "C" 16.

Similarly, the attached member network device "E" in operation 60 can respond to reception of the RREQ-DIO request message 28" (e.g., from the non-member network device "L") by generating and unicast transmitting a RREP-DIO reply message 62b specifying the network device "E" (at the IPv6 address "E::1" specified in the "DODAGID" field of the DIO Base Object) provides reachability to the targeted local DAG instance "A::A" 22 (identified in the ART Option) via the source-route path specified in the Address Vector field of the AODV-RPL RREP Option (e.g., "B::1" via "F7::1"), along with associated metrics for reaching the local DAG instance 22 via the network device "E" 16.

Referring to FIG. 3C, if in operation 64 the processor circuit 32 of the RPL network device 16 receiving the unicast RREP-DIO reply message 62 (e.g., 62a and/or 62b) determines (e.g., from the last hop in the AODV-RPL RREP Option) that it is not the requesting network device, the next-hop neighbor non-member device (e.g., "K" or "L") in operation 66 can respond to the unicast RREP-DIO reply message 62 by storing in its memory circuit 34 an AODV route entry that specifies that the local DAG instance "A::A" 22 is reachable via the neighboring member network device 16 specified in the DIO Base Object.

Hence, the next-hop neighbor non-member device "K" in operation 66 can add an AODV route entry specifying the local DAG instance "A::A" is reachable via the member network device "C" at the IPv6 address "C::1" from the RREP-DIO reply message 62a. The next-hop neighbor non-member device "L" in operation 66 can add an AODV route entry specifying the local DAG instance "A::A" is reachable via the member network device "E" at the IPv6 address "E::1" from the RREP-DIO reply message 62b. Each neighbor non-member device "K" or "L" 16 also can optionally update the metrics (based on local attributes) and unicast transmit the corresponding RREP-DIO reply message 62a or 62b to the next-hop device as specified in the source-routing path in the corresponding AODV-RPL RREP Option.

An optional operation by the non-member network devices is that the non-member network device "K" or "L" 16 can selectively choose in operation 66 to operate as a "guest" member of the local DAG instance "A::A" 22, enabling any other member network devices in the local DAG instance 22 to communicate directly with the "guest" member; in this case, the "guest" member can specify in its corresponding RREP-DIO reply message 62 (prior to unicast transmission to the next-hop device 16) that it is a "guest member" of the local DAG instance 22 (the "guest member" also can send a "guest" DODAG advertisement object (DAO) message to the neighboring member network device (e.g., "C") and/or the local root network device "A" for "guest" registration in the local DAG instance 22.

Alternately, the non-member network device "K" or "L" in operation 66 can choose to operate as a "hidden relay" between the requesting member device "B" 16 and the existing member (e.g., "C" or "E"), such that no other member network device 16 in the local DAG instance 22 can communicate with the hidden relay via the local DAG instance 22 (as apparent from the foregoing, any hidden relay device is still reachable via the global DAG instance 12).

Hence, the processor circuit 32 of the disconnected member network device "B" 16 in operation 68 can respond to reception of the RREP-DIO reply messages 62a and/or 62b, indicating reachability to the local DAG instance "A::A" 22 via the neighboring non-members "K" (at the IPv6 address "F6::1") or "L" (at the IPv6 address "F7::1"), by identifying in operation 70 optimized metrics from the received RREP-DIO reply messages 62a and 62b. Hence, the processor circuit 32 of the disconnected member network device "B" 16 in operation 70 can determine an optimized path for reaching the local DAG instance 22, and in response the processor circuit 32 of the disconnected member network device "B" 16 in operation 72 can create an AODV route entry specifying one or members (e.g., "C" or "E") of the local DAG instance 22 are reachable via neighboring non-members "K" (at the IPv6 address "F6::1") or "L" (at the IPv6 address "F7::1"), respectively. If present in the received RREP-DIO reply messages 62, the processor circuit 32 of the newly-joined RPL network device "B" 16 also can specify whether the next-hop network device is a "guest" member of the local DAG instance 22 or a hidden node. Hence, the member network device "B" 16 (and optionally the "guest" member network device "K") can join the local DAG instance "A::A" 22, as shown in FIG. 1E.

According to example embodiments, network devices that are unable to reach a local DAG instance in a global DAG instance of a wireless data network (e.g., a low power and lossy network), can initiate establishment of a relay route for reaching the local DAG instance via a non-member network device in the global DAG instance. The network devices receiving one or more replies can chose one or more AODV-based relay paths for reaching the local DAG instance via one or more non-member network devices operating as relays for the network devices. Hence, the example embodiments provide a self-healing mechanism for network devices attempting to reach a local DAG instance via non-member relays. The example embodiments provide a low-cost, highly-reliable and cost-effective solution for self-healing among network devices in a local DAG instance, without the necessity of any involvement by an external management entity.

Also note that multiple network devices that are unable to reach the same local DAG instance can send separate requests to join the same local DAG instance, for example based on deploying prescribed collision avoidance operations to ensure separate requests from different network devices do not interfere with each other.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
    determining, by a network device that is configured for joining a local directed acyclic graph (DAG) instance in a data network, an unreachability by the network device to any member of the local DAG instance;
    generating and broadcasting, by the network device, a request message that identifies the network device requesting to join the local DAG instance, the request message causing a neighboring network device in a global DAG instance of the data network to rebroadcast the request message for reception by a member of the local DAG instance, the neighboring network device a non-member of the local DAG instance;
    receiving, by the network device, a reply message indicating a member of the local DAG instance is reachable via the neighboring network device in the global DAG instance;
    receiving a second reply message from a second neighboring device in the global DAG instance and that is a non-member of the local DAG instance, the second reply message specifying a second member of the local DAG instance is reachable via the second neighboring network device;
    identifying an optimized path for reaching the local DAG instance based on respective metrics specified in the reply message and the second reply message; and selecting at least one of the neighboring device or the second neighboring device for reachability to the local DAG instance based on the identifying of the optimized path.

2. The method of claim 1, wherein the determining is based on one or more of:
   determining the unreachability to any member of the local DAG instance in response to expiration of a prescribed timer allocated for the network device to join the local DAG instance; or
   receiving an instruction from a second network device, via the global DAG instance, to initiate broadcasting of the request message for reception by any member of the local DAG instance.

3. The method of claim 1, wherein:
   the request message specifies an identifier of the local DAG instance in a target field of the request message, the identifier identifying a root node of the local DAG instance; and
   the request message further specifies a maximum rank field that limits downward propagation of the request message in the global DAG instance.

4. The method of claim 1, wherein the receiving includes the network device creating a route entry specifying the member of the local DAG instance is reachable via the neighboring network device, based on determining the neighboring network device provides an optimized metric relative to any other neighboring device having sent a corresponding reply message.

5. The method of claim 1, wherein the reply message indicates that the neighboring network device is one of a member of the local DAG instance or a hidden node relative to the local DAG instance.

6. The method of claim 1, wherein:
   the local DAG instance is distinct from the global DAG instance;
   the network device is preconfigured to join the local DAG instance, the broadcasting based on the determined unreachability to any member of the local DAG instance and without any instruction by any other network device in the global DAG instance.

7. An apparatus implemented as a physical machine, the apparatus comprising:
   non-transitory machine readable media configured for storing executable machine readable code;
   a device interface circuit configured for joining a global directed acyclic graph (DAG) instance in a data network; and
   a processor circuit configured for executing the machine readable code, and when executing the machine readable code operable for:
   determining, as a network device configured for joining a local DAG instance in the data network, an unreachability to any member of the local DAG instance,
   generating a request message and causing the device interface circuit to broadcast the request message, the request message identifying the network device requesting to join the local DAG instance, the request message causing a neighboring network device in the global DAG instance to rebroadcast the request message for reception by a member of the local DAG instance, the neighboring network device a non-member of the local DAG instance, and
   establishing reachability to the local DAG instance based on receiving, by the network device, a reply message indicating a member of the local DAG instance is reachable via the neighboring network device in the global DAG instance, wherein:
   the device interface circuit is configured for receiving a second reply message from a second neighboring device in the global DAG instance and that is a non-member of the local DAG instance, the second reply message specifying a second member of the local DAG instance is reachable via the second neighboring network device;
   the processor circuit is configured for identifying an optimized path for reaching the local DAG instance based on respective metrics specified in the reply message and the second reply message; and
   the processor circuit is configured for selecting at least one of the neighboring device or the second neighboring device for reachability to the local DAG instance based on the identifying of the optimized path.

8. The apparatus of claim 7, wherein the processor circuit is configured for determining the unreachability to any member of the local DAG instance based on one or more of:
   expiration of a prescribed timer allocated for the network device to join the local DAG instance; or
   the device interface circuit receiving an instruction from a second network device, via the global DAG instance, to initiate broadcasting of the request message for reception by any member of the local DAG instance.

9. The apparatus of claim 7, wherein:
   the processor circuit is configured for inserting into the request message an identifier of the local DAG instance in a target field of the request message, the identifier identifying a root node of the local DAG instance; and
   the processor circuit is configured for inserting into the request message the request message further specifies a maximum rank field that limits downward propagation of the request message in the global DAG instance.

10. The apparatus of claim 7, wherein the processor circuit is configured for creating, in the non-transitory machine readable media, a route entry specifying the member of the local DAG instance is reachable via the neighboring network device, based on determining the neighboring network device provides an optimized metric relative to any other neighboring device having sent a corresponding reply message.

11. The apparatus of claim 7, wherein the reply message indicates that the neighboring network device is one of a member of the local DAG instance or a hidden node relative to the local DAG instance.

12. The apparatus of claim 7, wherein:
   the local DAG instance is distinct from the global DAG instance;
   the broadcasting is based on the determined unreachability to any member of the local DAG instance and without any instruction by any other network device in the global DAG instance.

13. One or more non-transitory tangible media encoded with logic for execution by a machine and when executed by the machine operable for:
   determining, by the machine implemented as a network device that is configured for joining a local directed acyclic graph (DAG) instance in a data network, an unreachability by the network device to any member of the local DAG instance;
   generating and broadcasting, by the network device, a request message that identifies the network device requesting to join the local DAG instance, the request message causing a neighboring network device in a global DAG instance of the data network to rebroadcast the request message for reception by a member of the local DAG instance, the neighboring network device a non-member of the local DAG instance;

receiving, by the network device, a reply message indicating a member of the local DAG instance is reachable via the neighboring network device in the global DAG instance;

receiving a second reply message from a second neighboring device in the global DAG instance and that is a non-member of the local DAG instance, the second reply message specifying a second member of the local DAG instance is reachable via the second neighboring network device;

identifying an optimized path for reaching the local DAG instance based on respective metrics specified in the reply message and the second reply message; and selecting at least one of the neighboring device or the second neighboring device for reachability to the local DAG instance based on the identifying of the optimized path.

14. The one or more non-transitory tangible media of claim 13, wherein the determining is based on one or more of:

determining the unreachability to any member of the local DAG instance in response to expiration of a prescribed timer allocated for the network device to join the local DAG instance; or receiving an instruction from a second network device, via the global DAG instance, to initiate broadcasting of the request message for reception by any member of the local DAG instance.

15. The one or more non-transitory tangible media of claim 13, wherein:

the request message specifies an identifier of the local DAG instance in a target field of the request message, the identifier identifying a root node of the local DAG instance; and the request message further specifies a maximum rank field that limits downward propagation of the request message in the global DAG instance.

16. The one or more non-transitory tangible media of claim 13, wherein the receiving includes the network device creating a route entry specifying the member of the local DAG instance is reachable via the neighboring network device, based on determining the neighboring network device provides an optimized metric relative to any other neighboring device having sent a corresponding reply message.

17. A method comprising:

joining, by a network device, a global directed acyclic graph (DAG) instance in a data network;

receiving, by the network device, a request message that is broadcast by a requesting network device in the global DAG instance, the request message indicating the requesting network device is requesting to join a local DAG instance in the data network;

determining, by the network device, that the network device is a non-member of the local DAG instance identified in the request message, and in response generating an updated request message based on inserting, into the request message, a network address of the network device, and broadcasting the updated request message;

receiving, by the network device, a unicast reply message indicating reachability information for reaching the local DAG instance; and unicast transmitting, by the network device to the requesting network device, an updated reply message indicating the local DAG instance is reachable via the network device, enabling the requesting network device to reach the local DAG instance via the network device.

18. The method of claim 17, wherein:

the reply message identifies a member network device of the local DAG instance, the updated reply message specifying that the member network device of the local DAG instance is reachable via the network device;

the network device responding to the unicast reply message by one of changing from the non-member of the local DAG instance by joining the local DAG instance as a corresponding member, or operating as a relay network device that is hidden from member device in the local DAG instance.

* * * * *